(12) United States Patent
Myers et al.

(10) Patent No.: US 11,077,425 B2
(45) Date of Patent: Aug. 3, 2021

(54) SYSTEMS AND METHODS FOR BODY-PROXIMATE RECOVERABLE CAPTURE OF MERCURY VAPOR DURING CREMATION

(71) Applicant: Regents of the University of Minnesota, Minneapolis, MN (US)

(72) Inventors: Sandra L. Myers, Minneapolis, MN (US); David R. Bowles, Minneapolis, MN (US); James Joseph Marti, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 338 days.

(21) Appl. No.: 16/329,873

(22) PCT Filed: Sep. 5, 2017

(86) PCT No.: PCT/US2017/050079
§ 371 (c)(1),
(2) Date: Mar. 1, 2019

(87) PCT Pub. No.: WO2018/045374
PCT Pub. Date: Mar. 8, 2018

(65) Prior Publication Data
US 2019/0193051 A1    Jun. 27, 2019

Related U.S. Application Data

(60) Provisional application No. 62/383,043, filed on Sep. 2, 2016.

(51) Int. Cl.
*B01J 20/28* (2006.01)
*B01D 53/64* (2006.01)
(Continued)

(52) U.S. Cl.
CPC .......... *B01J 20/2805* (2013.01); *A61G 99/00* (2013.01); *B01D 53/0407* (2013.01);
(Continued)

(58) Field of Classification Search
CPC . B01J 20/2805; B01J 20/28028; B01D 53/64; B01D 53/82
(Continued)

(56) References Cited

U.S. PATENT DOCUMENTS

| 803,474 A | 10/1905 | Dennis |
|---|---|---|
| 1,371,029 A | 3/1921 | Jennings |

(Continued)

FOREIGN PATENT DOCUMENTS

| AU | 20022318069 B2 | 2/2008 |
|---|---|---|
| BE | 784334 A | 10/1972 |

(Continued)

OTHER PUBLICATIONS

International Search Report and Written Opinion for PCT/US2017/050079 dated Nov. 21, 2017.
(Continued)

*Primary Examiner* — Anita Nassiri-Motlagh
(74) *Attorney, Agent, or Firm* — Patterson Thuente Pedersen, P.A.

(57) ABSTRACT

Systems and methods for body-proximate recoverable capture of mercury vapor emitted during cremation of human remains having dental amalgam fillings containing mercury. In various embodiments, one or more recoverable mercury sorbent packets comprise a combination of nanoparticles of one or more chalcogens and a particulate refractory material contained in a refractory material packaging. The recoverable packets capture and contain elemental mercury vapor emitted during cremation from dental amalgam fillings containing mercury. The recoverable packets are placed
(Continued)

external to the body and within the combustion chamber during cremation, and not within the flue or exhausts exiting the combustion chambers. In various embodiments, the recoverable packets are positioned within the casket or primary combustion chamber, and may be preferably positioned proximate the head and neck of the body with the aid of selectively-refractory containment structures. After cremation, the mercury laden recoverable sorbent packets may be removed from the ashen remains of the body, and optionally the mercury may be recovered and the sorbent packet reprocessed for reuse.

21 Claims, 12 Drawing Sheets

(51) Int. Cl.
  *B01D 53/82* (2006.01)
  *C04B 14/00* (2006.01)
  *B01D 53/04* (2006.01)
  *F23G 1/00* (2006.01)
  *C10G 70/00* (2006.01)
  *A61G 99/00* (2006.01)
  *B01J 20/02* (2006.01)

(52) U.S. Cl.
  CPC .............. *B01D 53/64* (2013.01); *B01D 53/82* (2013.01); *B01J 20/02* (2013.01); *B01J 20/28028* (2013.01); *C04B 14/00* (2013.01); *C10G 70/00* (2013.01); *F23G 1/00* (2013.01); *B01D 2253/106* (2013.01); *B01D 2253/108* (2013.01); *B01D 2253/11* (2013.01); *B01D 2253/112* (2013.01); *B01D 2257/602* (2013.01)

(58) Field of Classification Search
  USPC ......................................................... 423/210
  See application file for complete search history.

(56) References Cited

U.S. PATENT DOCUMENTS

| | | |
|---|---|---|
| 2,251,749 A | 8/1941 | Mandus |
| 2,440,187 A | 4/1948 | Silverberg |
| 3,527,218 A | 9/1970 | Westine |
| 3,661,509 A | 5/1972 | Ferrara et al. |
| 3,722,097 A | 3/1973 | Colman et al. |
| 3,786,619 A | 1/1974 | Melkersson et al. |
| 3,956,458 A | 5/1976 | Anderson |
| 4,227,910 A | 10/1980 | Deeg |
| 4,382,785 A | 5/1983 | Lococo |
| 4,781,174 A | 11/1988 | Gardner |
| 4,917,603 A | 4/1990 | Haack |
| 4,982,050 A | 1/1991 | Gammie et al. |
| 5,055,048 A | 10/1991 | Vassiliadis et al. |
| 5,066,597 A | 11/1991 | Stinson et al. |
| 5,182,099 A | 1/1993 | Jonsson et al. |
| 5,245,120 A | 9/1993 | Srinivasachar et al. |
| 5,275,564 A | 1/1994 | Vassiliadis et al. |
| 5,558,771 A | 9/1996 | Hagen et al. |
| 5,567,223 A | 10/1996 | Lindgren et al. |
| 5,607,496 A | 3/1997 | Brooks |
| 5,621,035 A | 4/1997 | Lyles et al. |
| 5,752,829 A | 5/1998 | Goldsmith et al. |
| 5,759,031 A | 6/1998 | Goldsmith et al. |
| 5,795,159 A | 8/1998 | Ralls et al. |
| 5,885,076 A | 3/1999 | Ralls et al. |
| 5,904,482 A | 5/1999 | Long et al. |
| 5,951,295 A | 9/1999 | Lyles et al. |
| 6,013,246 A | 1/2000 | Langworth |
| 6,047,711 A | 4/2000 | Wagner |
| 6,364,661 B1 | 4/2002 | Brattesani |
| 6,382,110 B1 | 5/2002 | Marz |
| 6,399,848 B1 | 6/2002 | Rechichi |
| 6,401,632 B1 | 6/2002 | Kaehr |
| 6,409,803 B1 | 6/2002 | Tremel et al. |
| 6,701,855 B2 | 3/2004 | Barba |
| 6,709,271 B2 | 3/2004 | Yin et al. |
| 6,790,038 B2 | 9/2004 | Hubner et al. |
| 7,021,932 B2 | 4/2006 | Standish |
| 7,033,419 B1 | 4/2006 | Granite et al. |
| 7,303,395 B2 | 12/2007 | Hornig et al. |
| 7,306,460 B2 | 12/2007 | Hubner et al. |
| 7,435,286 B2 | 10/2008 | Olson et al. |
| 7,481,865 B2 | 1/2009 | Peltola et al. |
| 7,563,429 B2 | 7/2009 | Lundgren |
| 7,572,416 B2 | 8/2009 | Alward et al. |
| 7,658,891 B1 | 2/2010 | Barnes |
| 7,700,047 B2 | 4/2010 | Quimby et al. |
| 7,877,847 B2 | 2/2011 | Bills |
| 7,906,027 B2 | 3/2011 | Cross et al. |
| 8,168,147 B2 | 5/2012 | Olson et al. |
| 8,221,711 B1 | 7/2012 | Lee |
| 8,232,221 B2 | 7/2012 | Kuznicki |
| 8,235,319 B2 | 8/2012 | Sullivan |
| 8,241,410 B1 | 8/2012 | Pease et al. |
| 8,402,619 B2 | 3/2013 | Arcand et al. |
| 8,424,537 B2 | 4/2013 | Rosenthal |
| 8,506,923 B2 | 8/2013 | Hurt et al. |
| 8,512,655 B2 | 8/2013 | Olson et al. |
| 8,747,676 B2 | 6/2014 | Hughes et al. |
| 8,821,819 B2 | 9/2014 | Olson et al. |
| 8,931,147 B2 | 1/2015 | Sullivan |
| 9,038,829 B2 | 5/2015 | Hurt et al. |
| 9,339,669 B2 | 5/2016 | Kay |
| 2006/0048646 A1 | 3/2006 | Olson et al. |
| 2007/0007878 A1 | 1/2007 | Lundgren |
| 2007/0240719 A1 | 10/2007 | Duarte |
| 2009/0062119 A1 | 3/2009 | Olson et al. |
| 2010/0047146 A1 | 2/2010 | Olson et al. |
| 2010/0132173 A1 | 6/2010 | Arcand et al. |
| 2011/0049045 A1 | 3/2011 | Hurt et al. |
| 2011/0052463 A1 | 3/2011 | Hurt et al. |
| 2012/0030841 A1 | 2/2012 | Koerber et al. |
| 2012/0245402 A1 | 9/2012 | Ross |
| 2012/0324789 A1 | 12/2012 | Pease et al. |
| 2014/0252270 A1 | 9/2014 | Lehman, Jr. |
| 2014/0308188 A1 | 10/2014 | Olson et al. |
| 2014/0366342 A1 | 12/2014 | Fenton et al. |
| 2015/0090580 A1 | 4/2015 | Tinsley et al. |
| 2015/0246315 A1 | 9/2015 | Olson et al. |

FOREIGN PATENT DOCUMENTS

| | | |
|---|---|---|
| CA | 934131 A | 9/1973 |
| CS | 694090 A3 | 2/1992 |
| EP | 0385742 A1 | 9/1990 |
| EP | 0420957 A4 | 11/1991 |
| EP | 0515551 A1 | 12/1992 |
| EP | 0499677 B1 | 8/1994 |
| EP | 0581829 B1 | 10/1998 |
| EP | 1265689 A1 | 12/2002 |
| EP | 1691896 B1 | 4/2018 |
| JP | H 0720497 B2 | 3/1995 |
| JP | H 08511958 A | 12/1996 |
| JP | 3927126 B2 | 6/2007 |
| JP | 2012503545 A | 2/2012 |
| JP | 2015504504 A | 2/2015 |
| JP | 2017532031 A | 11/2017 |
| NL | 1010533 C1 | 5/1999 |
| NL | 1009283 C1 | 11/1999 |
| NL | 1009285 C1 | 11/1999 |
| NL | 1011990 C2 | 11/2000 |
| SE | 463653 B | 1/1991 |
| UA | 86789 C2 | 5/2009 |
| WO | WO912877 | 9/1991 |
| WO | WO 1992/020969 A1 | 11/1992 |
| WO | WO 1996/024700 A1 | 8/1996 |
| WO | WO 1998/006478 A1 | 2/1998 |
| WO | WO 2000/019557 A1 | 4/2000 |
| WO | WO 2009/017479 A1 | 2/2009 |

(56) References Cited

FOREIGN PATENT DOCUMENTS

| WO | WO 2009/025003 A2 | 2/2009 |
| WO | WO 2013/073361 A1 | 5/2013 |
| WO | WO 2015/114212 A1 | 8/2015 |

OTHER PUBLICATIONS

Reindl, Summary of Reference on Mercury Emissions from Crematoria, Sep. 25, 2012, 44 pages.

Johnson et al., "Mercury Vapor Release from Broken Compact Fluorescent Lamps and in Situ Capture by New Nanomaterial," Environ. Sci. Technol., 2008, 5772-5778.

Myers, "Quantifying Mercury Emissions Resulting from the Cremation of Dental Amalgam in Minnesota," University of Minnesota Twin Cities, Sep. 2015, 11 pages.

Kumar et al., "Synthesis of Selenium Particles with Various Mophologies," Clarkson University, Potsdam, NY, vol. 416, Feb. 2014, 119-123.

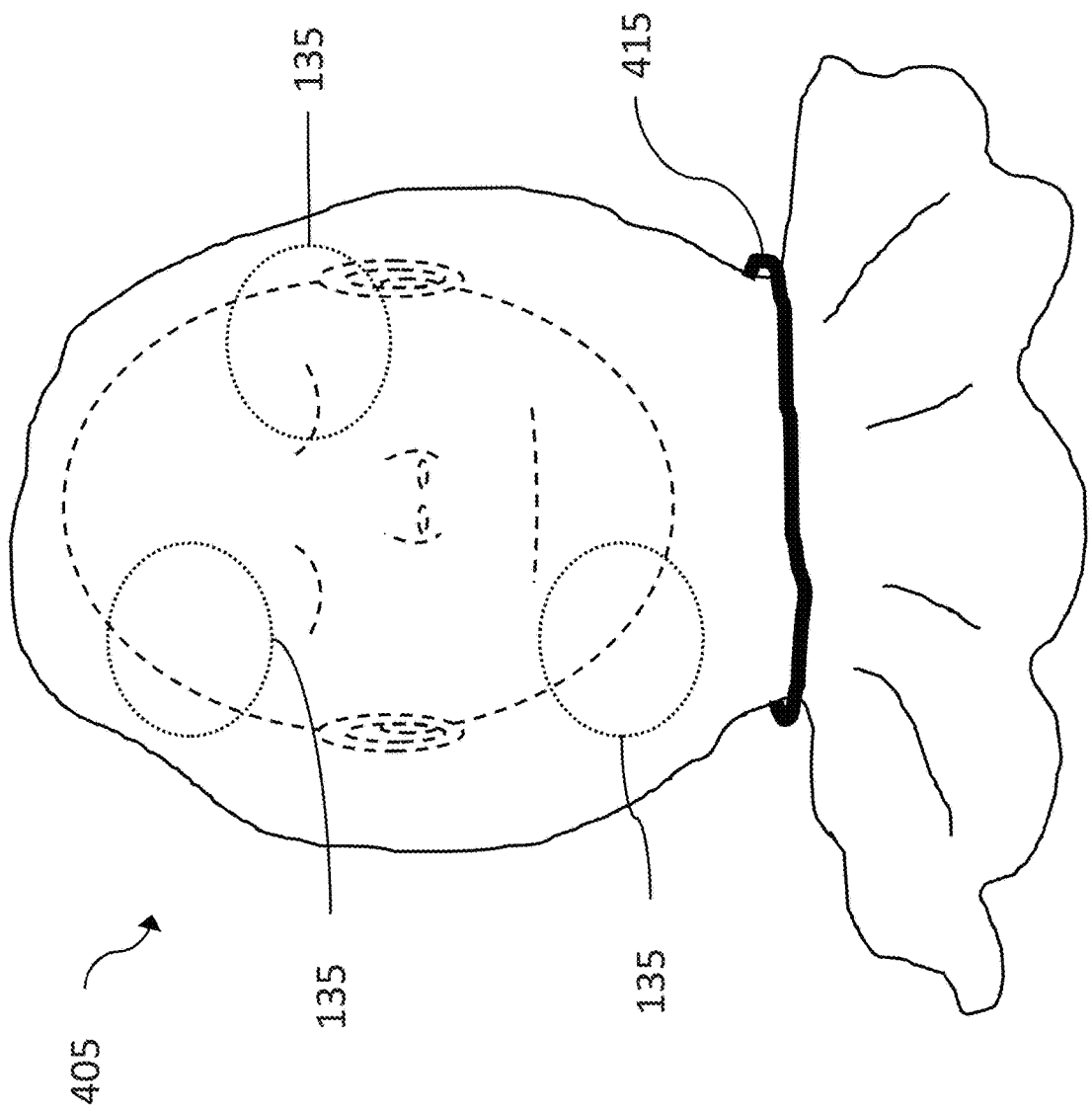

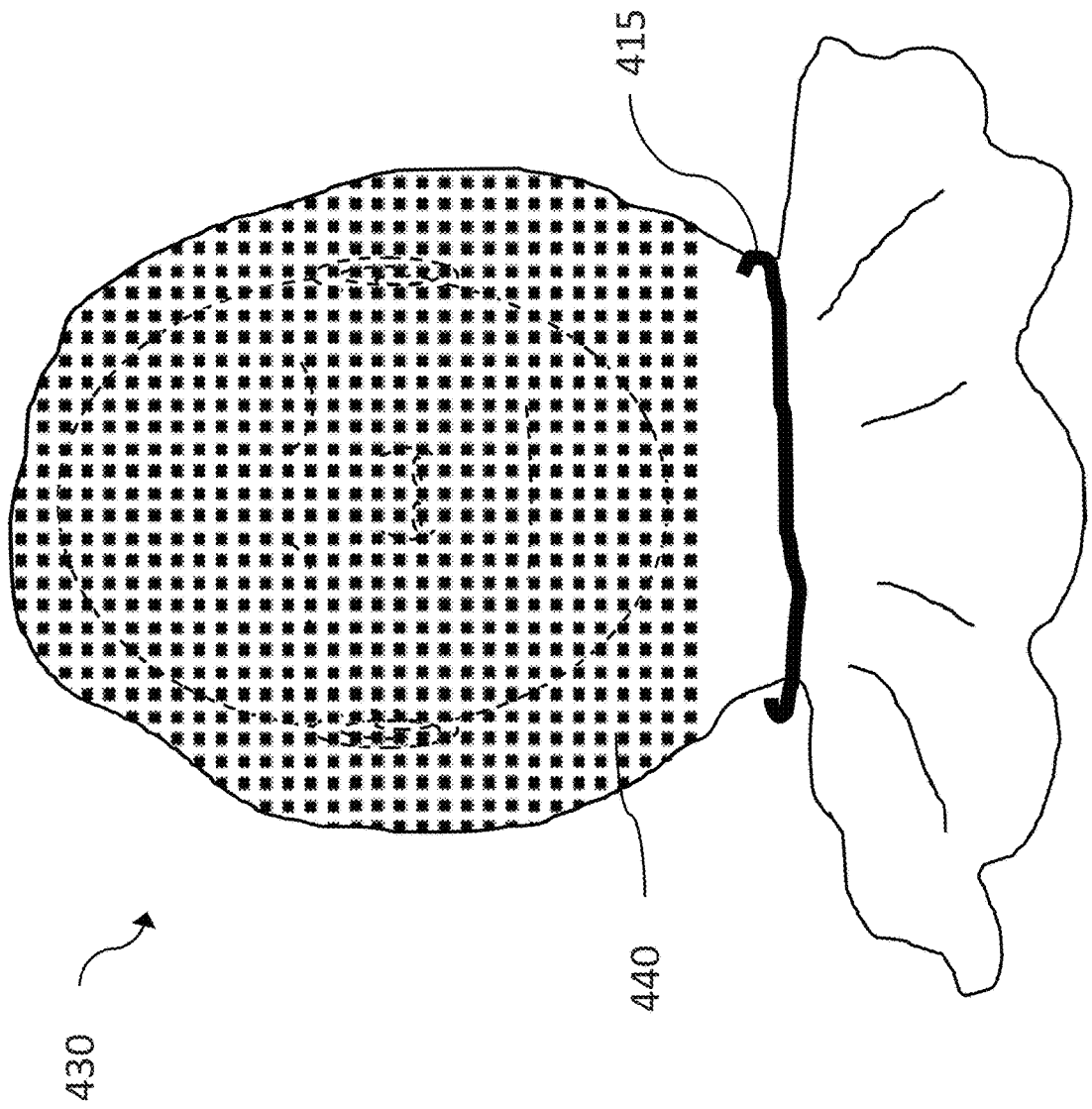

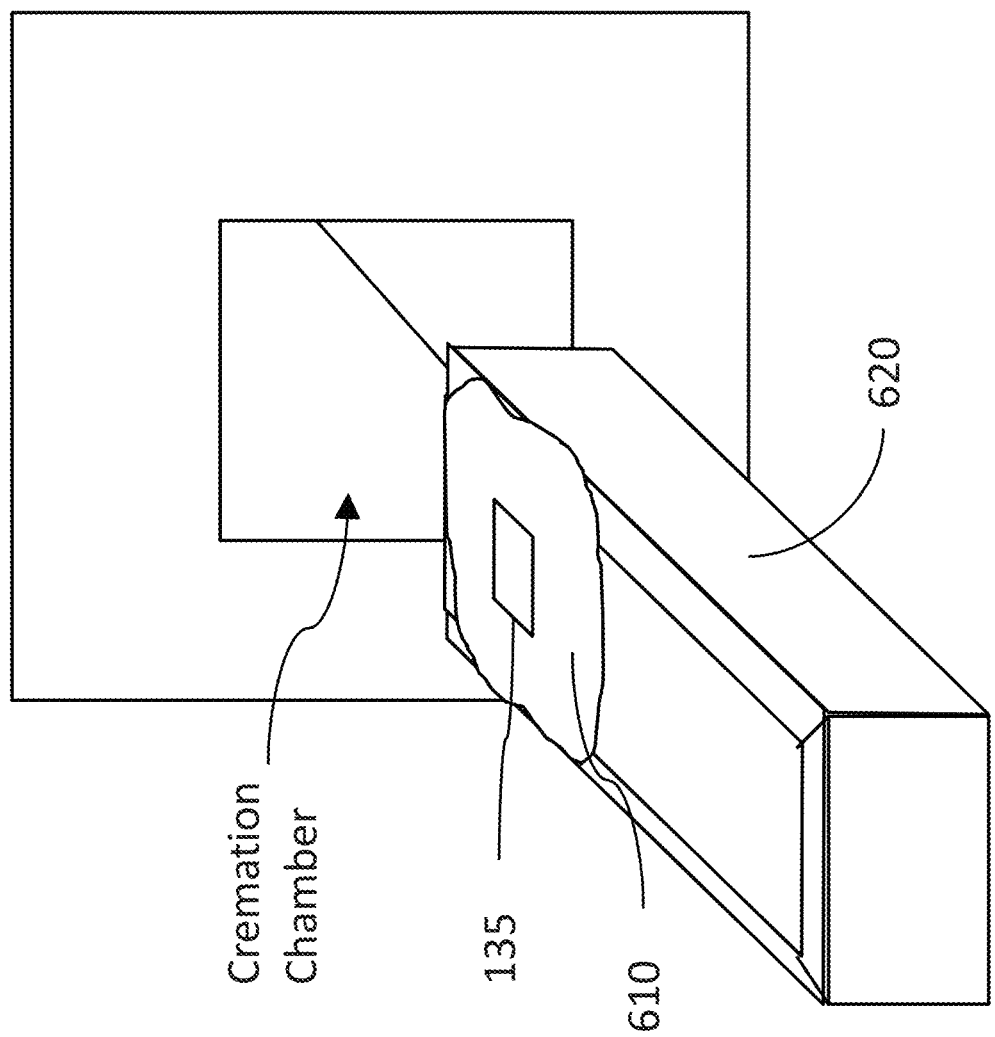

SYSTEMS AND METHODS FOR BODY-PROXIMATE RECOVERABLE CAPTURE OF MERCURY VAPOR DURING CREMATION

RELATED APPLICATIONS

The present application is a National Phase entry of PCT Application No. PCT/US2017/050079, filed Sep. 5, 2017, which claims priority to U.S. Provisional Application No. 62/383,043, filed Sep. 2, 2016, the contents of each being incorporated herein by reference in their entireties.

TECHNICAL FIELD

Embodiments relate generally to capture and control of mercury vapor, and more particularly to devices, systems, and methods for proximate recoverable capture of mercury vapor emitted during cremation of human remains having fillings made of dental amalgam containing mercury in their teeth.

BACKGROUND

Dental amalgam has been used as filling material for cavities for more than 150 years. In most of these dental amalgam compositions, elemental mercury comprises around 50% of the mixture with the remaining 50% being various compositions of silver, copper, tin, and other materials. While mercury is a highly toxic substance to humans and most other living organisms, elemental mercury in dental amalgam only releases very low level of mercury in the form of vapor. Thus, health regulation bodies, such as the Federal Drug Administration, currently deem dental amalgam containing high mercury compositions safe for use in dentistry.

Unfortunately, once a person is deceased and cremated, the mercury previously contained within these fillings is emitted into the environment at a much faster rate due to the cremation process. Mercury emitted into the environment during cremation causes toxicity concerns. The Environmental Protection Agency estimated mercury emissions from crematoria at 3,000 kg (6,500 pounds) per year in their flow model for 2005-2010. This is a 350% increase from their 1990 flow model. Further, the Mercury Policy Project predicts mercury emissions from crematoria will rise to 7,700 kg (17,000 pounds) by 2020. Implementation of reduction technologies and phase-out of mercury-containing products will lead to zero mercury emissions by 2025 for many industries. In contrast, emissions of mercury from cremation are steadily rising, and are projected to continue increasing to 2025 and beyond. Crematoria owners face government regulations and mandates to reduce mercury emissions, impacting the cost of cremation.

To address increasing mercury emissions from cremation, some crematoriums have implemented mercury scrubbers into their exhaust systems to capture and contain mercury emitted during cremation. However, mercury scrubber systems are expensive and generally built for industrial applications. Many crematoriums are small mortuaries or funeral homes that cannot absorb the cost of exhaust scrubbers.

One approach to reducing mercury emissions from cremation is to extract teeth with dental amalgam fillings containing mercury prior to cremation. In practice, this approach is too labor intensive and often ineffective. Once rigor mortis sets in, the jaw can only be opened with great force or the jaw must be broken to access the teeth for extraction. Further, it is sometimes difficult to identify which teeth have amalgam fillings, such as when the fillings are hidden under ceramic crowns. As a result, the only way to ensure that any teeth having mercury containing dental amalgams are extracted is to extract all the teeth prior to cremation.

Another approach to lower the cost of capturing mercury for small crematorium is to provide for a single-use mercury containment system. For example, U.S. Pat. No. 8,402,619 to Arcand et al. describes the application of a thermal protectant around the teeth and amalgam fillings to encapsulate the fillings containing mercury in a refractory material that can survive the cremation process and thereby reduce the emission of mercury vapor. The encapsulation process utilizes a curable thermal protectant that is applied to the teeth using a dental containment device and applicator. Once the thermal protectant is cured, the body can be cremated. If the thermal protectant properly encapsulates the dental amalgam fillings and surrounding teeth, the teeth and any dental amalgam fillings containing mercury should survive cremation as a residual solid. The use of such a protectant, however, adds an additional process step and is not reversible, either of which may be undesirable.

Another approach is a single-use mercury reaction system as described in European Patent No. 0 515 551 to Von Platen, in which an aluminum ampoule filled with elemental selenium is placed on top of a coffin before cremation. During cremation, the aluminum melts at a predetermined temperature lower than the cremation temperature, thereby releasing the elemental selenium to vaporize and react with the vaporized mercury as the teeth are cremated. The products of this reaction condense into mercury selenide particles that become part of the ashen remains of the body. While this process can reduce the relative amount of mercury vapor that may be released during cremation, the results of this reaction are neither consistent nor controllable, and the resulting mercury selenide particles are not separately recoverable.

In lieu of cremation, some mortuaries and funeral homes have resorted to an alternative process called resomation. In resomation, or alkaline hydrolysis, the body is placed in a pressure chamber that is filled with a mixture of water and lye. Then the chamber is heated and pressurized until the tissue of the body is broken down and turned into liquid. During resomation, much lower levels of mercury from dental amalgam fillings containing mercury are released into the environment. Unfortunately, resomation is more expensive than cremation and has questionable legal status in many jurisdictions.

There is a continuing need for a more effective system and method for capturing and controlling mercury emitted during the cremation process that can be implemented by small crematoriums.

SUMMARY

Embodiments of the present application provide for systems and methods for body-proximate recoverable capture of mercury vapor emitted during cremation of humans having dental amalgam fillings containing mercury in their teeth. In various embodiments, one or more recoverable mercury sorbent packets comprise a combination of nanoparticles of selenium and/or other chalcogens and a particulate refractory material contained in a refractory material packaging. The recoverable packets capture and contain elemental mercury vapor emitted during cremation from dental amalgam fillings containing mercury. The recoverable packets are designed to be placed proximate the body during cremation, and not within the flue or exhausts exiting the combustion chambers. In various embodiments, the recoverable packets are positioned within the casket or primary combustion chamber, and may be preferably positioned proximate the head and neck of the body with the aid of selectively-refractory containment structures. After cremation, the mercury laden recoverable sorbent packets may be removed from the ashen remains of the body, and optionally the mercury may be recovered and the sorbent packet reprocessed for reuse.

In one embodiment, a containment structure comprises a selectively-closeable hood and mercury sorbent packets selectively arranged within the hood such that the packets are secured within the hood and proximate the nose, mouth, eyes, ears and/or neck of the body. Once the hood is placed over the head, a closure mechanism can be deployed to create a restriction and/or seal of the hood relative to the body/head to create an expandable gas containment region proximate the covered portion of the body. For example, a drawstring could be tightened around the neck creating a volume within the hood to facilitate the capture the mercury vapor. During cremation, the mercury is vaporized but does not leave the volume within the hood where the mercury reacts with and is captured by the sorbent packets. In various embodiments, the hood is selectively-refractive in that the flash point of the material of the hood is greater than the vaporization temperature of mercury, and optionally the cremation temperature for the body, but less than the final operating temperature of the combustion chamber. Once the head and hood reach a temperature above that which exceeds the temperature that the mercury has vaporized, the hood reaches its flash point and is burned away. After cremation is complete, the recoverable packets remain, along with the ashen remains of the body. In another embodiment, the recoverable packets are separate from the hood and positioned within the hood when the hood is being placed over the head of the body, for example. Further, a hood embodiment may comprise a sorbent layer applied to the inner surface of the hood in lieu of, or in addition to, the separately included sorbent packets.

In other embodiments, the mercury sorbent packets are carried by a non-refractory face shield or mask. In these embodiments, the structure of the face shield or mask positions the recoverable packets proximate the nose, mouth, eyes, ears and/or neck of the body. When cremation is complete, the entire structure of the face shield and mask remains, along with the mercury sorbent packets, and ashen remains of the body. In another embodiment, the mask is made of a selectively-refractory material, being burned away during cremation, leaving only the recoverable packets and the ashen remains of the body.

In another embodiment, the mercury sorbent packets are positioned on an internal surface of a primary combustion chamber of the cremation chamber, such as the ceiling, side walls, or back walls of the primary combustion chamber. In some embodiments, the mercury sorbent packets can be positioned within a containment structure that is secured to an internal surface of the primary combustion chamber. In some embodiments, the containment structure includes a louvered or slotted surface facing the interior of the primary combustion chamber. In some embodiments, selective access to an interior portion of the retaining structure is provided by a hinged, pivotable or slidable panel.

BRIEF DESCRIPTION OF THE DRAWINGS

The invention may be more completely understood in consideration of the following detailed description of various embodiments in connection with the accompanying drawings, in which:

FIG. 5A is a front view of the hood device of FIG. 4 with mercury sorbent packets loosely held within.

FIG. 5B is a front view of the hood device of FIG. 4 with a mercury sorbent layer lining the inner surface of the hood device.

FIG. 6 is an isometric view of an embodiment of a mercury-capturing shroud device placed over the head area of a coffin being placed in a cremation chamber.

Figure 1:
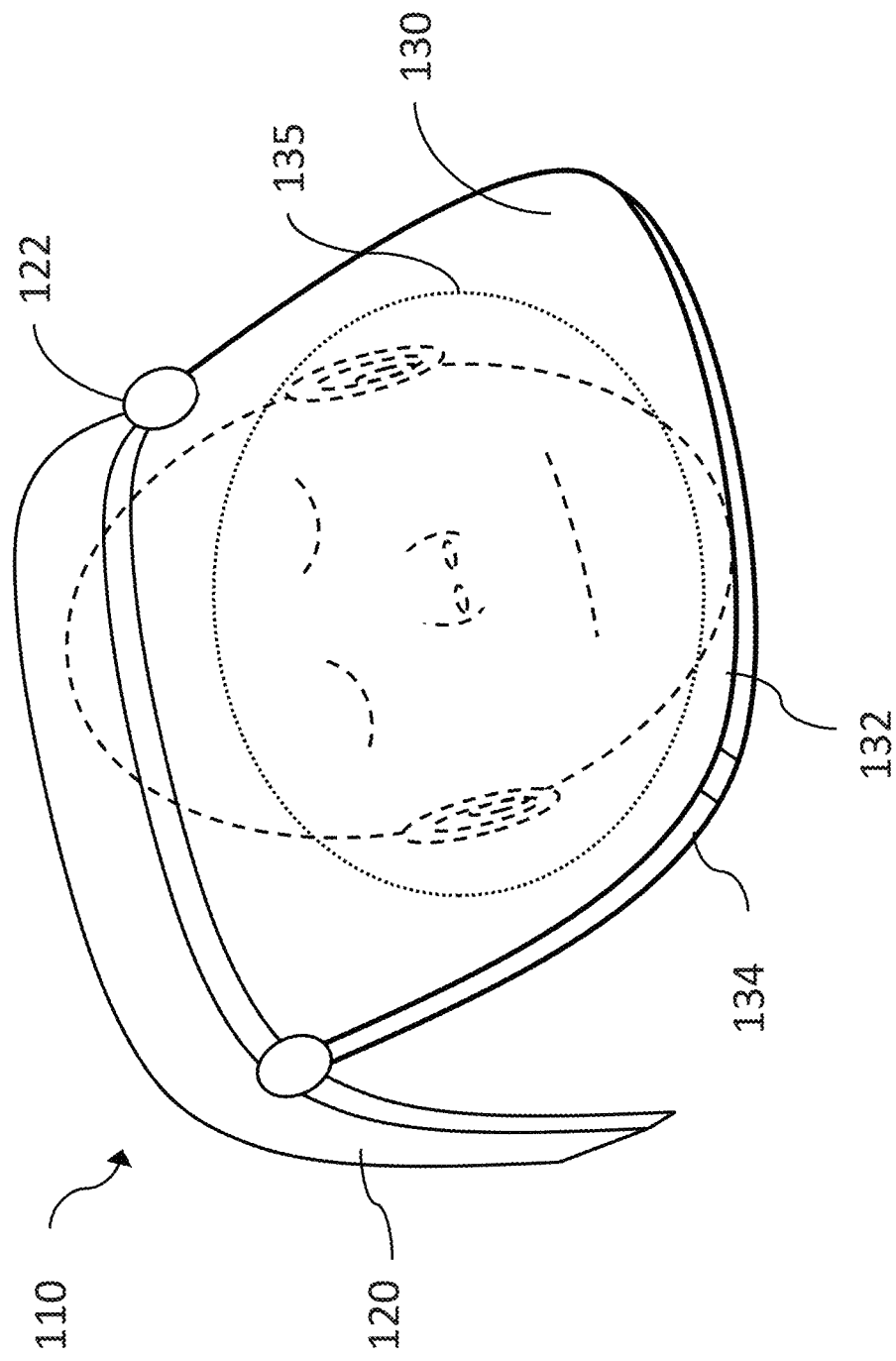
FIG. 1 is an isometric view of an embodiment of a face shield which holds a mercury sorbent package.

While the invention is amenable to various modifications and alternative forms, specifics thereof have been shown by way of example in the drawings and will be described in detail. It should be understood, however, that the intention is not to limit the claimed invention(s) to the particular embodiments described. On the contrary, the intention is to cover all modifications, equivalents, and alternatives falling within the spirit and scope of the claimed invention as defined by the appended claims.

DETAILED DESCRIPTION OF THE DRAWINGS

In embodiments, one or more mercury sorbent packets in accordance with the various embodiments can be placed in various locations throughout a primary combustion chamber of a cremation chamber or proximate to the body during cremation, and not within the flue or exhausts exiting the combustion chambers. The primary combustion chamber is where the primary ignition and burning of human remains occurs. The secondary combustion chamber of a cremation chamber burns only unburned combustible materials that are not burned in the primary combustion chamber. Because the initial burning of the human remains occurs largely in the primary combustion chamber, it is advantageous to locate mercury sorbent packets in the primary combustion chamber.

As the primary combustion chamber heats to operating temperature, gas phase elemental mercury ($Hg^0$) will be emitted from any dental amalgam fillings containing mercury in the mouth of the body. The mercury sorbent packets will collect mercury by chemisorption and by chemical reaction with the active component of the mercury sorbent pack. The sorbent packet is structured and packaged to be removed intact after cremation, allowing the mercury-laden sorbent to be retrieved from the remaining ash for disposal and/or reprocessing to recover the mercury.

In one embodiment, shown in FIG. 1, a face shield 110 comprises a frame 120 which is coupled to a face mask 130. Frame 120 and mask 130 can either be fixedly coupled or hingedly attached at hinge 122 allowing mask 130 lift away from the head. Frame 120 is shaped to fit over the forehead of the body and have a strap around the back of the head securing face mask 130 to the head. In other embodiments, frame 120 can merely rest on the forehead of the body without being secured by strap or other securing method.

Mask 130 is shaped to cover the entire face of the body and in some embodiments extend to the ears and neck area. Mask 130 further comprises an upper plate 132 and a lower plate 134 arranged such that a mercury sorbent packet 135 fits between upper plate 132 and lower plate 134. Both upper plate 132 and lower plate 134 are semi-permeable such that mercury vapor can pass freely across their cross sections.

Figure 2:
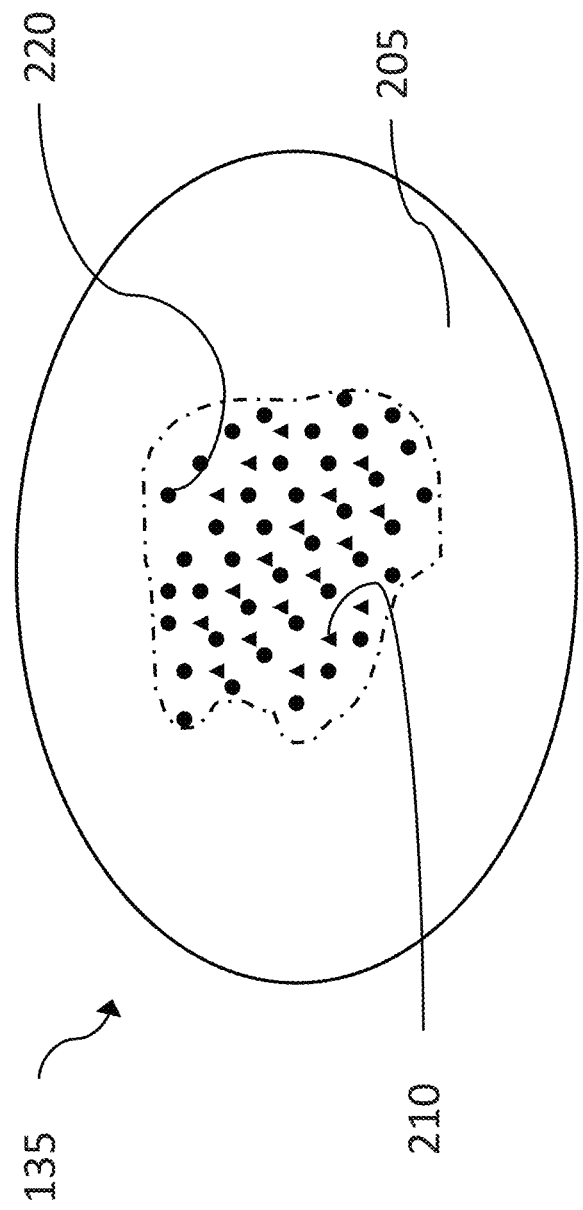
FIG. 2 is a front view of an embodiment of a mercury sorbent package with a cutaway showing active and inactive sorbent material within.

In embodiments, packets 135 can comprise an outer shell 205 which holds a sorbent mixture of an active particle 210 attached to inactive refractory particles 220 as shown in FIG. 2. Shell 205 comprises refractory fabric, such as woven ceramic fabric, that can withstand the temperatures common to cremation. Further, shell 205 is semi-permeable such that mercury vapor can enter pack 135 via shell 205 freely but the particulate contents cannot exit packet 135.

Active particles 210 can comprise any chalcogenic particles. Chalcogenic particles are particles comprising chalcogen elements, i.e., the solid elements in group 16 of the period table of elements, namely selenium (Se), sulfur, (S), and tellurium (Te). Particles will have a peak size ranging from 50 nm to tens of microns. Active particles 210 bond chemically with vaporized mercury and form a relatively inert solid that is recoverable after cremation. These particles can be synthesized via reduction chemistry. For example, selenium particles may be produced by the reduction of selenous acid by hydroquinone as described in Kumar et al, Journal of Colloid and Interface Science 416 (2014) 119-123, which is hereby incorporated by reference, or other suitable methods. As synthesized, the Se particles are dispersed in water. These dispersions are added to several types of substrates and dried to form a dry powder sorbent. In embodiments where active particle 210 is made from selenium, the relatively inert solid that is formed during cremation is mercury selenide (HgSe).

To further capture of mercury by chemisorption, packet 135 can also comprise inactive refractory particles 220. Refractory particles 220 can variously comprise fine silica sand, zeolites, and other refractory materials of several bead and pore sizes having a peak size ranging from 50 nm to tens of microns. Refractory particles 220 allow chemisorption at all temperatures as refractory particles 220 can withstand temperatures above those that are seen during cremation.

In an alternative embodiment, packets 135 may comprise refractory clay, as opposed to refractory particles 220. The refractory clay would be impregnated with active particles 210 and could be in either malleable, pre-fired condition or partially or fully sintered before loading into the cremation chamber. After cremation, the refractory clay would be fully sintered.

Figure 3:
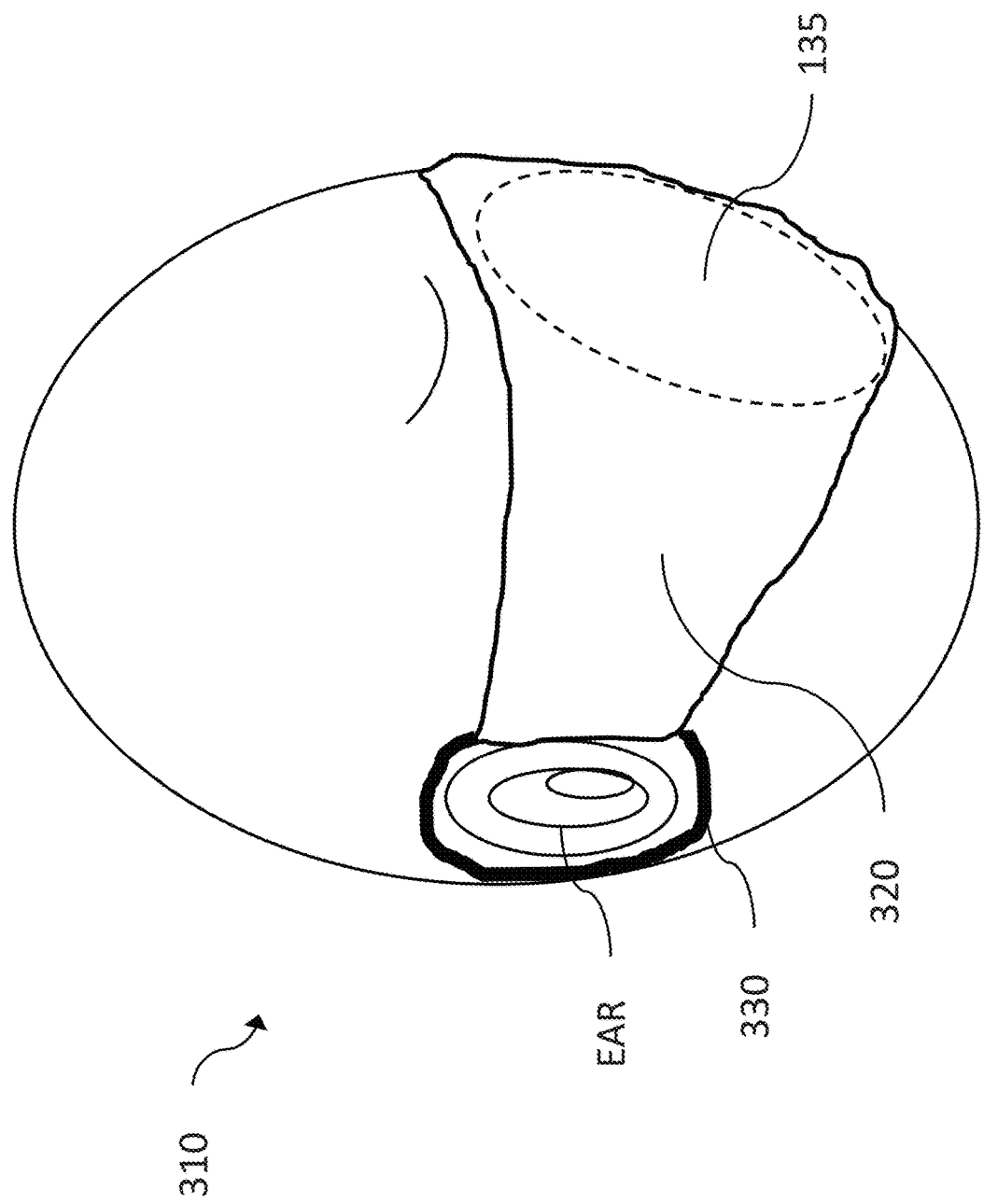
FIG. 3 is a side view of an embodiment of a mask holding mercury sorbent packets that is placed on the human head.

In another embodiment shown in FIG. 3, mouth shield 310 could be a low profile embodiment that does not require a drawstring or any major structure. Mouth shield 310 comprises a main cover 320 and ear straps 330. The main cover 320 holds packets 135 that are arranged to be placed over the nose, mouth and ears. In other embodiments, main cover 320 can be extended to allow coverage over the eyes and neck along with the nose, mouth and ears. Mouth shield 310 may be prepackaged with packets 135 already fixed to the main cover 320 or, in another embodiment, main cover 320 could have pockets such that packets 135 could be placed within the main cover 320 at any time. Ear straps 330 are attached to the each side of the main cover 320 such that ear straps 330 extend around the ear to provide fixation to the head of the body. In some embodiments, main cover 320 and ear straps 330 may be made from refractory material such that they can be recovered, along with packets 135, after cremation or reused with new packets 135. In other embodiments, main cover 320 and ear straps 330 may be made of consumable material that burns away during cremation but allows packets 135 to remain in position during the bulk of the mercury vapor release.

In another embodiment, mercury sorbent packets 135 are selectively arranged on a hood 405 that is to be placed over the head of the body. Hood 405 comprises a sheet of fabric sized to cover the head, neck and upper shoulder area of the body. Within hood 405, a plurality of mercury sorbent packets 135 are arranged such that the packets are positioned proximate areas of the orifices and/or skin-only portions of the head where vaporized mercury is more likely to escapes from the body during cremation. In one embodiment, shown in FIG. 4, hood 405 can have packets 135 arranged on the hood such that it covers the eyes, mouth, and neck of the body. In other embodiments, hood 405 can have packets placed over any other combination of orifices, such as ears, or any other portion of the body that is likely to permit mercury vapor to escape, such as the neck below the jawbone.

Figure 4:
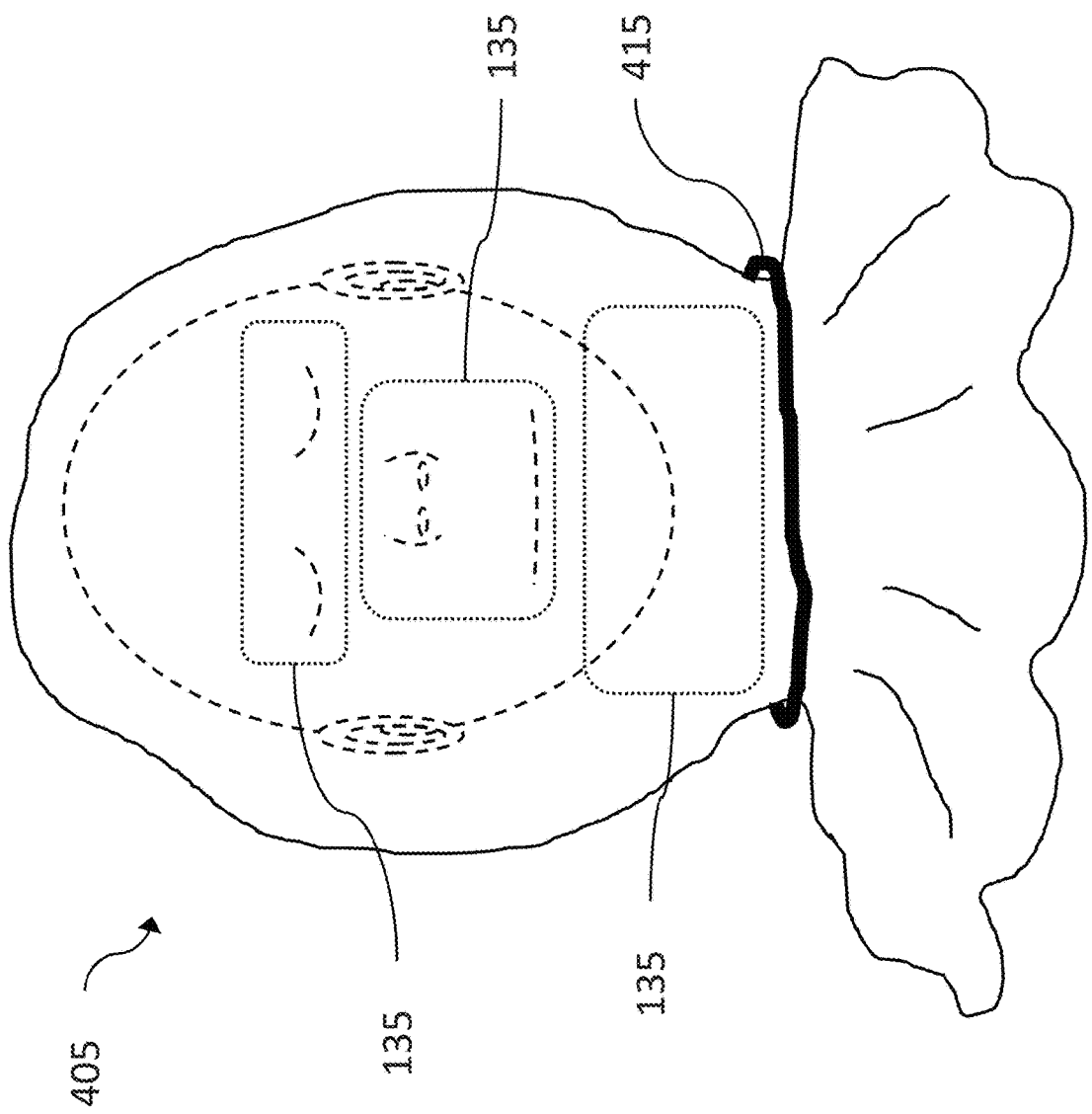
FIG. 4 is a front view of an embodiment of a hood device that holds mercury sorbent packets.

In embodiments shown in FIG. 4, a drawstring 415 is arranged on hood 405 such that it can draw closed around the body body's neck to ensure mercury vapor does not escape without being captured by packets 135. In embodiment, hood 405 is made of fabric that can withstand temperatures above 360° C. but below the final operating temperatures of a crematorium such that mercury laden packets 135, as well as the ashen remains of the body, are the only materials left after cremation. In another embodiment, hood 405 is made of refractory material of the same composition of the refractory material of pack 135, or other suitable refractory material, such that hood 405 withstands the entire cremation process and is reclaimed along with the mercury laden packets 135 after cremation.

In another embodiment, shown in FIG. 5A, packets 135 are not fixed to hood 405, but are instead allowed to be placed freely within hood 405. Packets 135 remain in the head area above drawstring 415 during cremation until hood 405 is burned away. In another embodiment, hood 405 is made of refractory material such that hood 405 withstands the entire cremation process and is reclaimed along with the mercury laden packets 135 after cremation. This embodiment allows for cheaper construction of hood 405 because there is no manufacturing step that involves affixing packets 135 to specific positions with the hood 405.

In another embodiment as shown in FIG. 5B, a sorbent hood 430, similar in size and shape of hood 405, would be made of refractory material and directly treated with selenium and/or other active sorbent material. In this embodiment, a sorbent dispersion, i.e. nanoparticles of the active mercury sorbent dispersed in water, would be applied to an interior surface of sorbent hood 430, and optionally an exterior surface, and dried such that a mercury sorbent layer 440 is created. Application of selenium to various cloth and other textiles materials is described in U.S. Pat. No. 8,506,923 to Hurt et al, which is incorporated herein by reference. Hurt et al describes a method of creating mercury sorbent packaging for disposal of mercury containing light bulbs by using selenium solution dispersed onto textiles. The mercury sorbent textiles are then allowed to dry and are then used to encapsulate the spent light bulbs containing mercury. In embodiments, sorbent layer 440 covers the area of the hood that is proximate the neck, eyes, ears, nose and mouth of the body. In other embodiments, the sorbent layer 440 could be selectively arranged within hood 430 to improve efficiency of the mercury-sorbent reaction. This embodiment potentially improves the sorbent reactivity with mercury by exposing a thin layer of sorbent particles over a larger surface area than what would be available in packets 135.

In another embodiment shown in FIG. 6, packets 135 are attached to a shroud 610 which is laid over the head and neck region of a body positioned with a loading coffin 620. Loading coffin 620 may be a traditional wooden coffin, a cardboard cremation coffin, or any other suitable body containment device. In various embodiments, shroud 610 is made of a selectively-refractory material, or of a completely-refractory material, either rigid or having some degree of flexibility, such that it can survive the cremation process. In some embodiments, packets 135 may be centrally located on shroud 610 such that the mercury vapor is directed by shroud 610 to packet 135. In other embodiments, shroud 610 may be shaped such that it directs mercury vapor to a non-centrally arranged packet 135. In other embodiments, packets 135 may be positioned in a lining within the loading coffin that is positioned above and/or below the face-region of the body. In another embodiment, shroud 610 could be treated with a sorbent dispersion, similar to hood 430, such that a sorbent layer is formed on one, or both surfaces of shroud 610 eliminating the need of packets 135.

Figure 7:
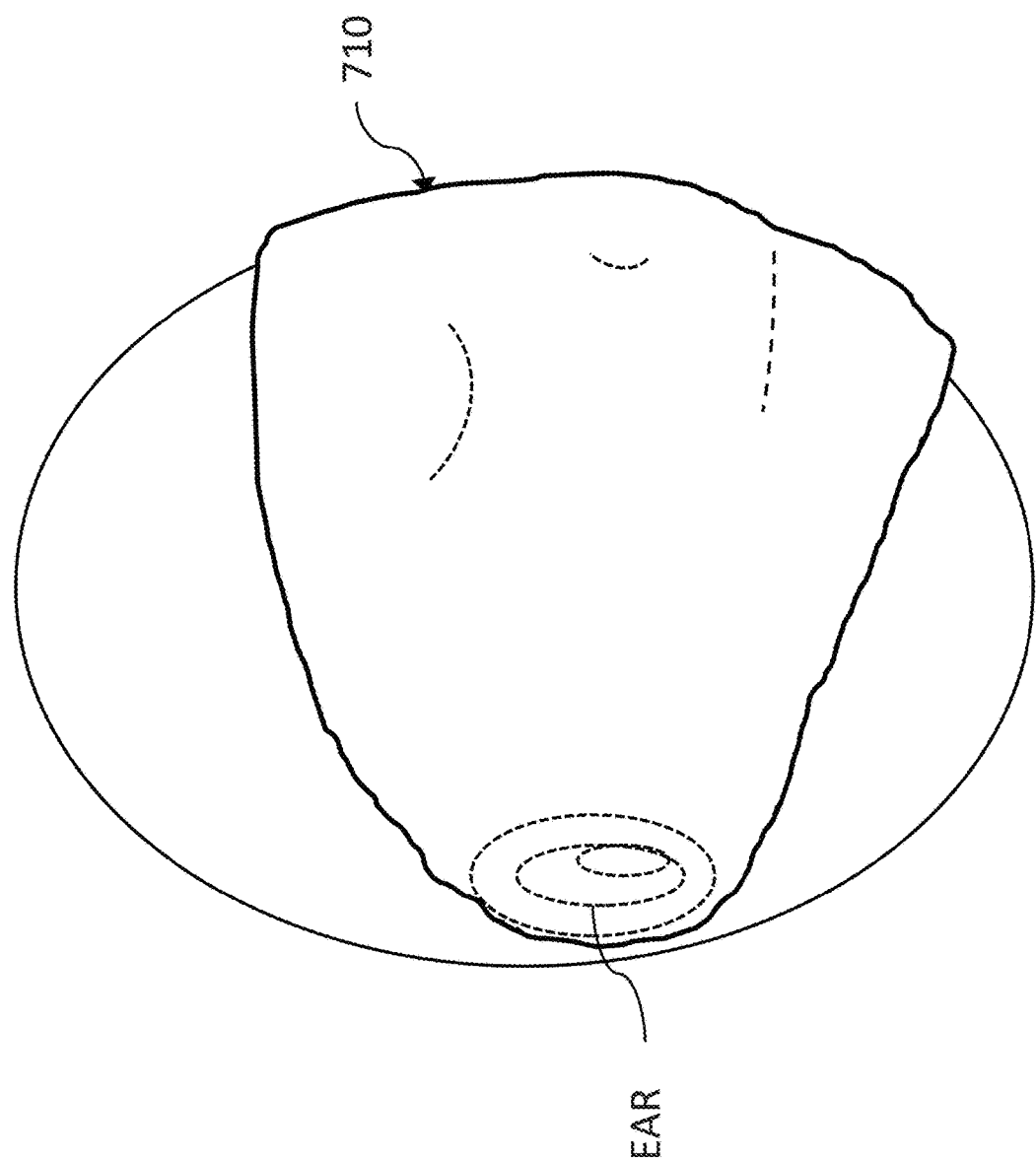
FIG. 7 is a side view of an embodiment of a ceramic mask impregnated with mercury sorbent particles placed on the human head.

In another embodiment shown in FIG. 7, a ceramic mask 710 selectively covers the ears, nose, mouth, eyes, and in some embodiments, the neck area of the body. In embodiments, ceramic mask 710 comprises sorbent-impregnated clay that forms to the head and neck of the body and sinters to a hard ceramic during cremation.

In use, hood 405 would be placed over the head of the body such that packets 135 are situated proximate their intended areas. For example, hood 405 in the embodiment shown in FIG. 4, would be place over the head of the body such that the three packets 135 lay over the eye, nose, mouth, and neck regions of the head. In the embodiment of hood 405 shown in FIG. 5A, the hood would be place over the head of the body, in no particular orientation, and then a plurality of packets 135 would be place within hood 405 as well. Similarly, but without needing packets 135, sorbent hood 430, as shown in FIG. 5A would be placed over the head and neck of the body. Once any variant of hood 405 or sorbent hood 430 is placed over the head, drawstring 415 is then pulled, creating a pocket or volume surrounding the head of the body, enclosing all of the openings of the head and neck where mercury vapor would escape. With hood 405 or sorbent hood 430 secured to the head and neck of the body, the body is then loaded into the cremation chamber at operational temperature.

In a similar process, face shield 110 and mouth shield 310 are placed over the head and secured, if embodiments allow. The body with face shield 110 and mouth shield 310 attached are then loaded into the cremation chamber at loading temperature. In both face shield 110 and mouth shield 310 embodiments, the body is burned to ash while the face shield 110 and mouth shield 310 remain intact. After cremation, the mercury laden flat filter 140 and packets 135 are retrieved from face shield 110 and mouth shield 310, respectively, and properly disposed of. In some embodiments, mouth shield 110 may alternatively be consumed during cremation, similar to the non-refractory embodiment of hood 405.

In contrast to the embodiments shown in. FIGS. 1, 3-5, the embodiment of shroud 610 is shown in FIG. 6 being placed on the loading coffin 620, instead of directly on the body. During the cremation process, the loading coffin, being made of consumable material, burns away leaving shroud 610 with selectively arranged packets 135 situated over the head and neck area of the body of the body. At this time, shroud 610 begins to direct mercury vapor produced from the dental amalgam fillings through packets 135 in order to capture the mercury vapor. Once the cremation is complete, shroud 610 with selectively arranged packets 135 is removed from the ashen remains of the body.

In the ceramic mask 710 embodiment, ceramic mask 710 would begin as a sheet of sorbent-impregnated clay in its malleable, pre-fired state. Ceramic mask 710 would then be applied to the head and neck area of the body such that the ears, nose, mouth, eyes, and neck are covered by ceramic mask 710. During cremation, mercury would react with the impregnated sorbent to produce a stable mercury compound and the clay portion of the ceramic mask would sinter into a hard ceramic creating a stable repository for the mercury compound.

Figure 8:
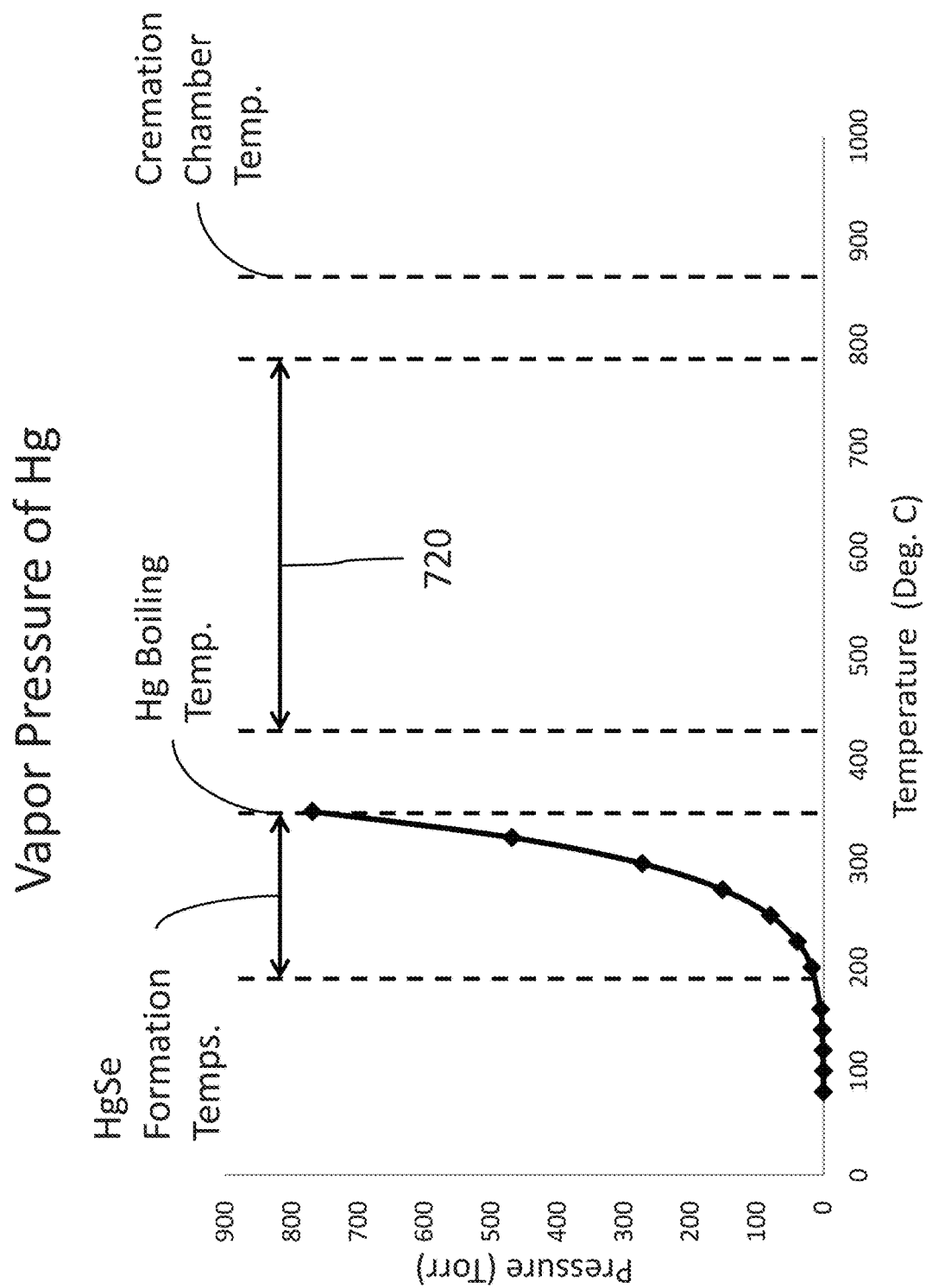
FIG. 8 is a graph showing the vapor pressure curve of mercury.

Once the body and an embodiment of the mercury capture device described herein is loaded into the cremation chamber, the mercury from the amalgam fillings of the deceased will begin to volatilize and leave the solid amalgam. FIG. 8 shows that mercury begins to substantially vaporize just above 200 degrees C. and continues until it is fully gaseous at 360 degrees C. and above. Once mercury is vaporized, the mercury begins to react with one or more of the chalcogens present in the sorbent, forming a mercury chalcogenide (HgS, HgSe, HgTe). in the embodiments described herein. These mercury chalcogenides are much more stable under high heat than either pure mercury or the pure chalcogen, making them much more suitable for controlled disposal of after cremation. In embodiments of hood 405 and sorbent hood 430, mercury chalcogenides begin to substantially form above 200 degrees C. and continues past the mercury boiling point until there is no longer any non-vaporized mercury remaining. Because hood 405 and sorbent hood 430 creates a pocket or volume around the head of the body capturing the mercury vapor, mercury chalcogenide continues to form above the mercury boiling point.

Figure 9:
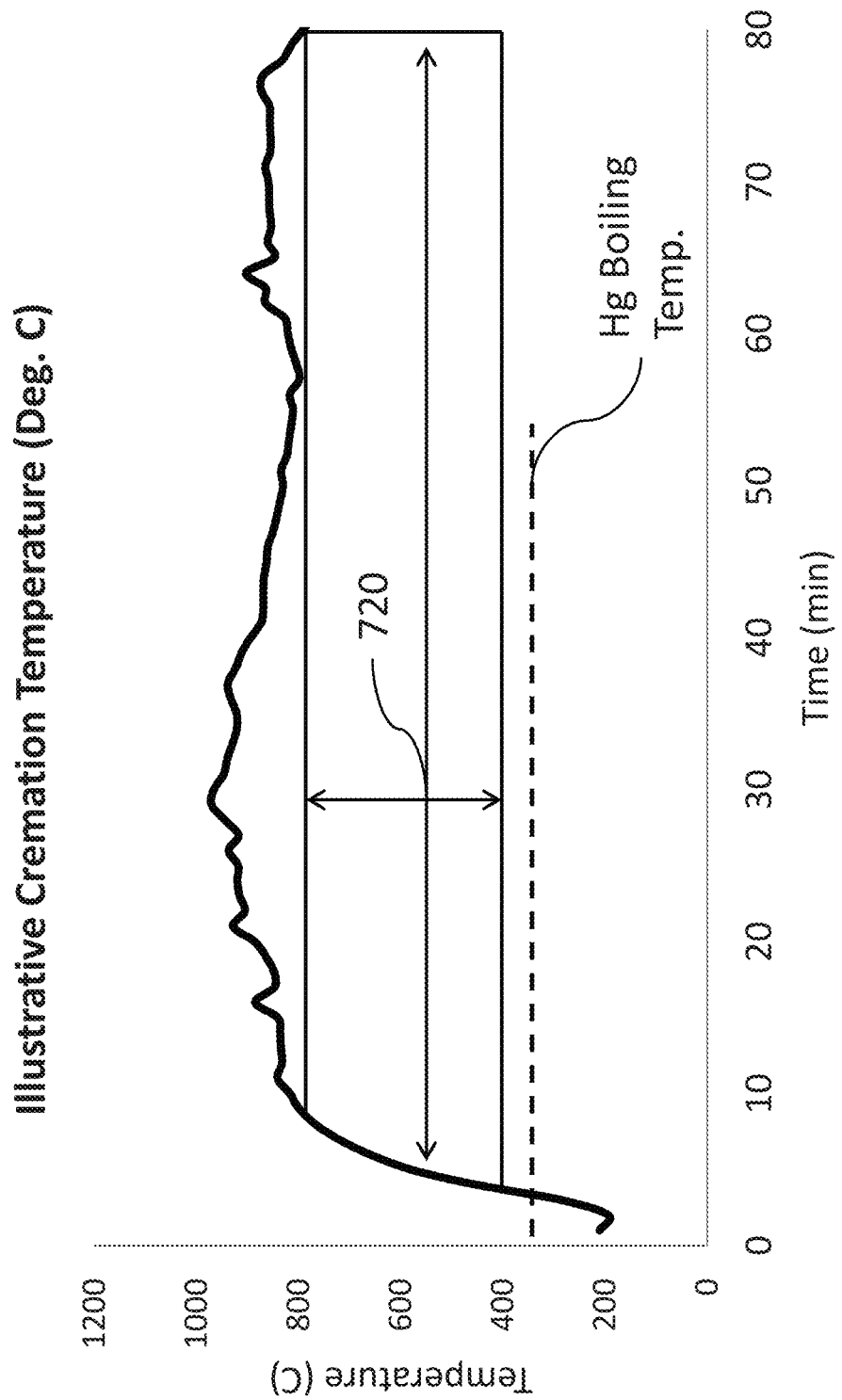
FIG. 9 is a graph showing the temperatures commonly found within a cremation chamber during a cremation.

In consumable embodiments of mask 310, hood 405, and shroud 610, the consumable material is designed to burn and disintegrate within a consumable region 720. FIG. 9 shows that consumable region 720 begins above the mercury boiling temperature but does not exceed the cremation chamber temperature. The consumable region 720 is defined by the temperature at which a consumable material fully burns and disintegrates after a full cremation. In other words, consumable region 720 is bounded by a minimum and maximum temperature, and it is also bound by duration. For example, one consumable material may begin to burn at 600 degrees C. but not fully disintegrate for 60 minutes, while another consumable material may begin to burn at 600 degrees C. but fully disintegrate within 10 minutes. Consumable region 720 allows consumable embodiments of mask 310, hood 405, and shroud 610 to survive full mercury vaporization but allow eventual burning and disintegration. Some embodiments of mask 310, hood 405, and shroud 610 will include consumable material that can fall anywhere within consumable region 720. Further, consumable embodiments of hood 405 are advantaged by having a burning and disintegration temperature within consumable region 720 because hood 405 is then able to maintain the pocket or volume around the head after the mercury has fully vaporized above 360 degrees C.

Figure 10:
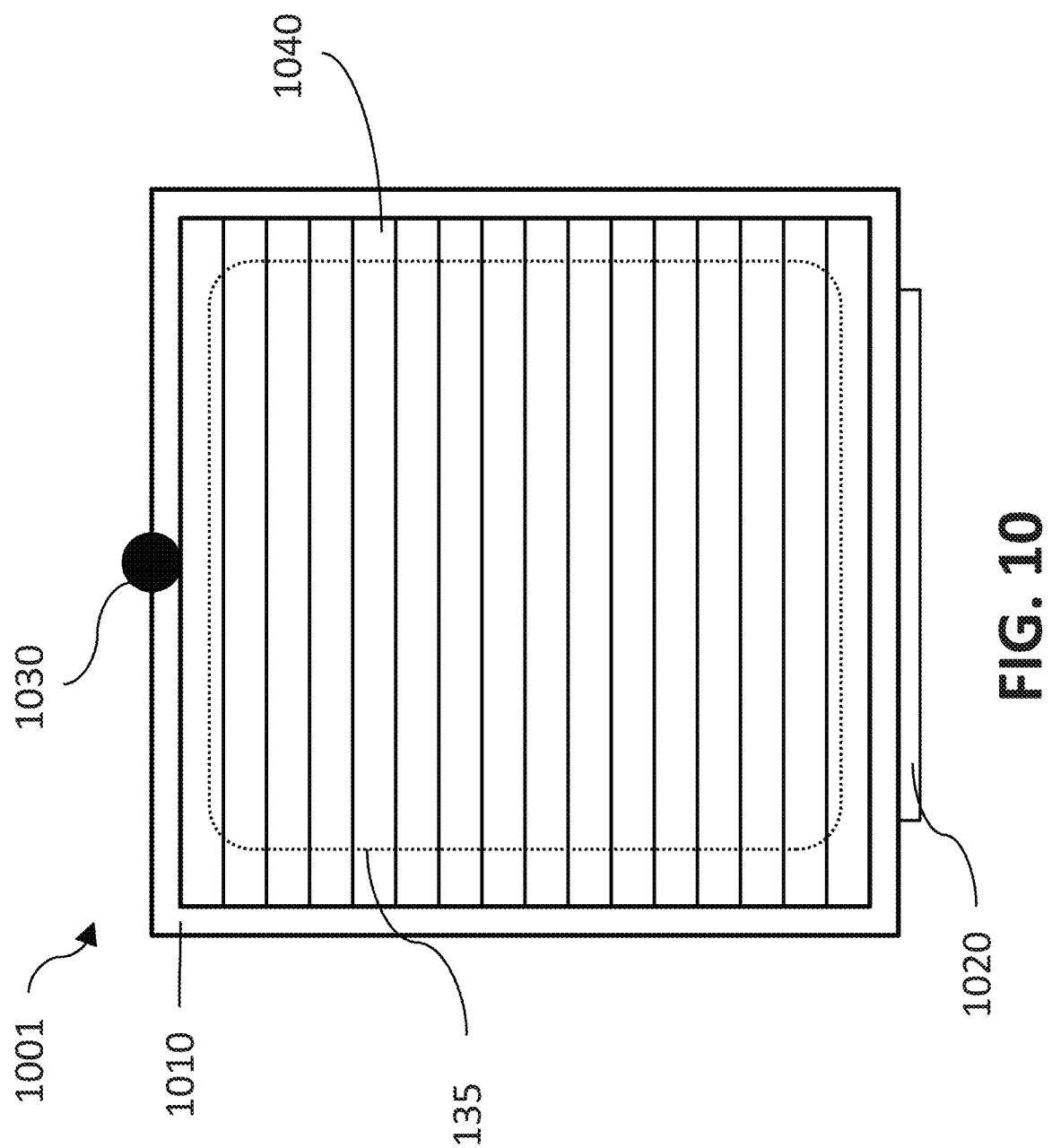
FIG. 10 is a front view of an embodiment of a containment structure adapted to be secured within a primary cremation chamber and in which mercury sorbent packets may be positioned.

In another embodiment, packets 135 can be arranged in various positions within the primary combustion chamber. In embodiments, the packets are arranged to remain proximate a given location within the primary combustion chamber during the combustion process which will involve high temperatures and turbulent gas flow within the chamber. For example, in some embodiments packets 135 can be securely coupled to one or more of the interior surfaces of the primary combustion chamber prior to insertion of the loading casket. In other embodiments as shown in FIG. 10, packets 135 can be positioned within one or more containment structures 1001 that are secured to the interior walls of the primary combustion chamber. In various embodiments, the packets 135 may be positioned within the one or more containment structures prior to insertion of the loading casket.

The containment structure 1001 comprises one or more movable surfaces or panels 1010 configured to provide selective access to an interior portion of the containment structure 1001. In the embodiment as shown in FIG. 10, a single panel 1010 may have a hinge 1020 arranged on one edge secured between the panel 1010 and an interior wall of the primary combustion chamber. A securing device 1030 can be arranged adjacent to another edge of the panel 1010.

In various embodiments, facilitating the gaseous flow from within the combustion chamber about the one or more packets 135 within containment structure 1001 can be accomplished by arranging apertures or perforations on a face or surface of panel 1010, or by other suitable means of allowing gases to flow through the interior portion of containment structure 1001. For example, louvers 1040 can be arranged on the panel 1010. In one embodiment, louvers 1040 can be arranged in an array across the broad face of louvered plate 1010. Louvers 1040 allow gasses to flow into the interior portion of containment structure 1001, but also protect the air passage created by each louver 1040 from falling ash and debris within the combustion chamber.

Figure 11:
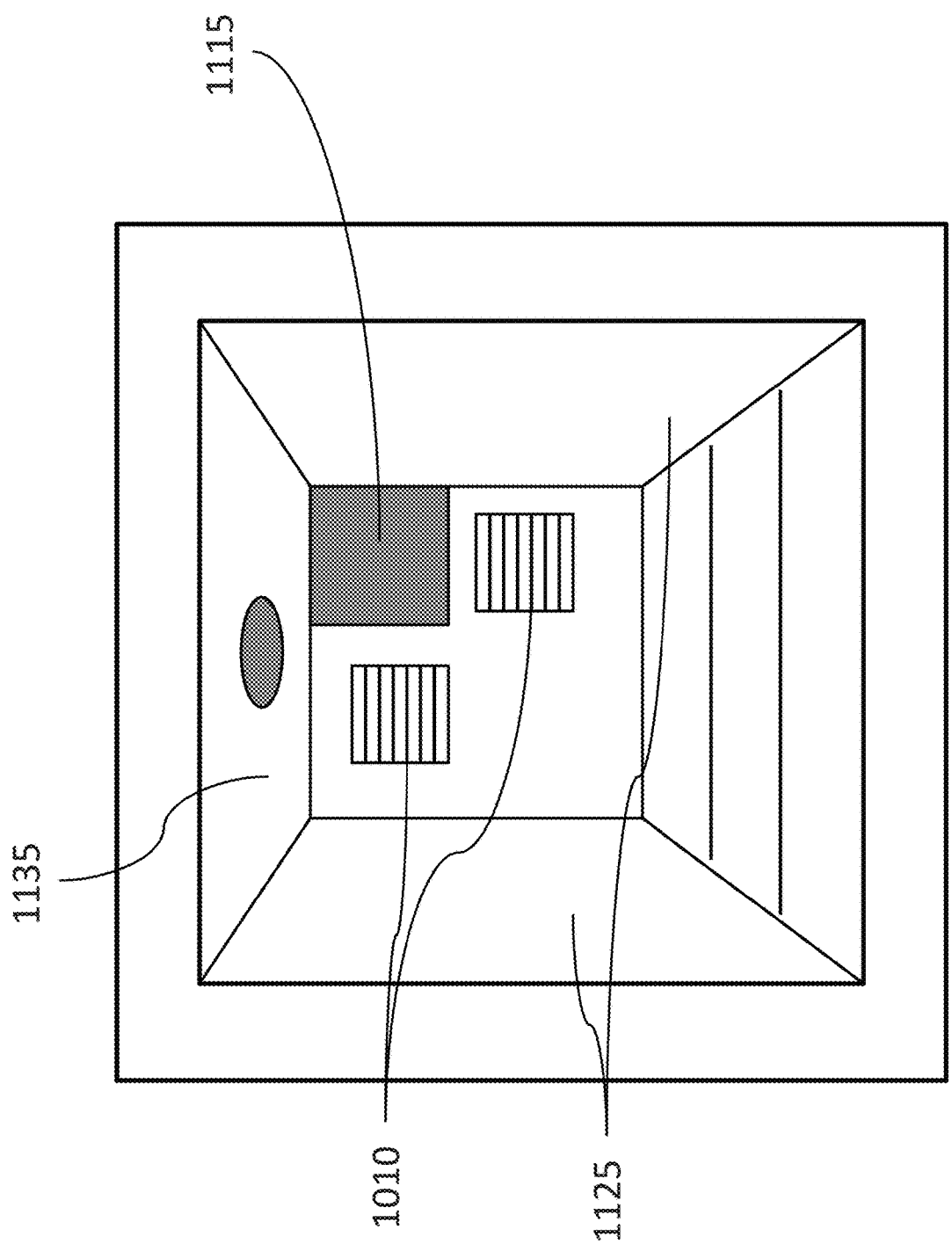
FIG. 11 is an isometric view of a primary combustion chamber showing an embodiment of a containment structure positioned within.

Containment structure 1001 may be selectively positioned at various locations within the primary combustion chamber. In cremation chamber design, gaseous flow is directed to one or more exits located within the primary combustion chamber. It is advantageous to position one or more containment structures 1001 where one or more containment structures 1001 would absorb the maximum amount of mercury vapor. In an example shown in FIG. 11, one or more containment structures 1001 can be arranged on the back wall of the primary combustion chamber where mercury vapors tend to travel to in some primary combustion chambers.

In another embodiment, one or more containment structures 1001 can also be arranged on the door of the primary combustion chamber. Arranging one or more containment structures 1001 on the door would position containment structures 1001 closer to the head of the body as caskets are conventionally loaded into the cremation chamber feet first. In other embodiments, one or more containment structures 1001 can be arranged the end wall, side walls, ceiling, and/or door of the primary combustion chamber. In embodiments, containment structures 1001 are positioned a distance away from any exposed burner jets within the combustion chamber to facilitate the packets 135 being exposed to a more consistent and less intense heat source during the combustion process.

In embodiments, the number and size of packets 135, or sorbent composition of sorbent hood 430 and ceramic mask 710 may be determined based on the total amount of mercury contained in the dental amalgam fillings of the body. Each embodiment could be produced on an individual scale to meet the mercury capture needs of each body, or alternatively, generalized sorbent content amounts could be produced to improve manufacturing efficiency. Determining the amount of sorbent in the embodiments could be produced from population averages. For example, the average dental amalgam tooth filling contains about 0.3 g of mercury. A person with four such fillings would then have about 1.2 g of total mercury. If selenium is used as an example chalcogen, to achieve full reaction of 1.2 g of mercury, approximately 0.5 g of selenium must be present. However, because 0.5 g of selenium must be superficially accessible to the mercury vapor in order to react, packets 135, sorbent hood 430, or ceramic mask 710 may have a predetermined excess of selenium in amounts that reflect the surface area availability in each type of embodiment.

After cremation, the packets 135 are intended to be recoverable intact. The mercury chalcogenide captured within each packet 135 can be processed to isolate the elemental mercury for proper disposal and recycle the elemental chalcogen after cremation. For example, U.S. Pat. No. 7,563,429 to Lundgren, the disclosure of which is hereby incorporated by reference, discloses a method of mercury selenide that is appropriate for captured mercury selenide from cremation. First the excess elemental selenium is leeched out with the use of hydrogen peroxide to form selenious acid. Then, the mercury selenide is neutralized to extract elemental mercury for disposition and elemental selenium for recycling.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for recoverable capture of mercury vapor emitted during cremation of a human body having dental amalgam fillings containing mercury in one or more teeth in the body, the system comprising:
   at least one mercury sorbent packet that includes a combination of chalcogenic nanoparticles and a particulate refractory material contained in a refractory material packaging, the at least one sorbent packet being configured to be placed proximate an exterior of the body during cremation, and not within the body or within an exhaust of a combustion chamber in which cremation of the body occurs,
   whereby the at least one sorbent packet captures and contains elemental mercury vapor emitted during cremation from dental amalgam fillings containing mercury and is configured to be removed from ashen remains of the body after cremation.

2. The system of claim 1 further comprising a containment structure configured to position at least one sorbent packet in a predetermined proximate relationship with the exterior of the body during cremation.

3. The system of claim 2 wherein the containment structure positions the at least one recoverable packet within an interior of a casket and proximate a head of the body.

4. The system of claim 2 wherein the containment structure comprises a face mask that positions the at least one recoverable packet proximate one or more of a nose, a mouth, an eye, an ears, or a neck of the body.

5. The system of claim 2 wherein the containment structure comprises a shroud in which the at least one sorbent packet is selectively arranged such that the sorbent packet is secured within the shroud and the shroud is configured to be positioned over a covered portion of the body to define an expandable gas containment region proximate the covered portion of the body during at least a portion of the cremation.

6. The system of claim 2 wherein the containment structure comprises a hood in which the at least one sorbent packet is selectively arranged and the hood is configured to be positioned over a head of the body to define an expandable gas containment region proximate the head during at least a portion of the cremation.

7. The system of claim 6 wherein the hood is selectively-closable and includes a closure mechanism that is configured to be deployed to restrict a flow of gases from the hood once the hood is placed over the head.

8. The system of claim 6 wherein the hood is configured such that the sorbent packet is secured within the hood and proximate at least one of a nose, a mouth, an eye, an ear or a neck of the body.

9. The system of claim 2 wherein the containment structure is selectively-refractive such that a flash point of a material of the containment structure is greater than a vaporization temperature of mercury, but less than a final operating temperature of the combustion chamber.

10. The system of claim 2 wherein the containment structure is secured to an interior surface of the combustion chamber prior to insertion of the body within the combustion chamber.

11. The system of claim 10 wherein the containment structure is configured with a selectively accessible interior portion within with at least one sorbent packet is positioned.

12. The system of claim 11 wherein the containment structure further comprises a perforated surface between the interior portion and the combustion chamber.

13. The system of claim 11 wherein the containment structure comprises a movable panel having a set of louvers defined in a surface of the movable panel that is between the interior portion of the containment structure and the combustion chamber.

14. The system of claim 1 wherein the at least one sorbent packet is configured to permit mercury to be recovered and the sorbent packet to be reprocessed for reuse.

15. A system for capture of mercury vapor emitted during cremation of a human body having dental amalgam fillings containing mercury in one or more teeth in the body, the system comprising:
   a fabric material having at least a portion of an inner surface coated with a sorbent layer that includes a combination of chalcogenic nanoparticles and a particulate refractory material, the inner surface of the fabric being configured to be placed proximate an exterior of the body during cremation, and not within the body or within an exhaust of a combustion chamber in which cremation of the body occurs,
   whereby the sorbent layer capture and contain elemental mercury vapor emitted during cremation from dental amalgam fillings containing mercury.

16. The system of claim 15 wherein the fabric material further comprises at least one pocket on the interior surface configured to accommodate a mercury sorbent packet that includes a combination of chalcogenic nanoparticles and a particulate refractory material contained in a refractory material packaging.

17. A mercury absorption device for absorption of mercury vapor emitted during cremation in a combustion chamber of a human body having dental amalgam fillings containing mercury in one or more teeth in the body, comprising:
   one or more reclaimable mercury sorbent packets having a mercury sorbent material encapsulated by a cremation resistant material; and
   a containment structure configured to be secured external to the body to position the one or more reclaimable mercury sorbent packets within the combustion chamber proximate the body.

18. The device of claim 17 wherein the containment structure is a hood and further includes a closure mechanism configured to contact a neck of the body and to secure the hood around the neck such that air flow is restricted out of the hood during at least a portion of the cremation.

19. The device of claim 17 wherein the containment structure is secured to an interior surface of the combustion chamber prior to insertion of the body within the combustion chamber and is configured with a selectively accessible interior portion within with at least one sorbent packet is positioned.

20. The device of claim 17 wherein the containment structure comprises a movable panel having a set of louvers defined in a surface of the movable panel that is between the interior portion of the containment structure and the combustion chamber.

21. A method of removing mercury released during cremation of a human body in a combustion chamber, comprising:
   providing a mercury sorbent material within a cremation resistant material to form a reclaimable mercury sorbent packet; and prior to cremation, placing one or more of the reclaimable mercury sorbent packets within a containment structure configured be secured external to the human body within the combustion chamber.

* * * * *